Dec. 6, 1955          J. J. DANIELS          2,726,092
CHUCK
Filed July 7, 1952
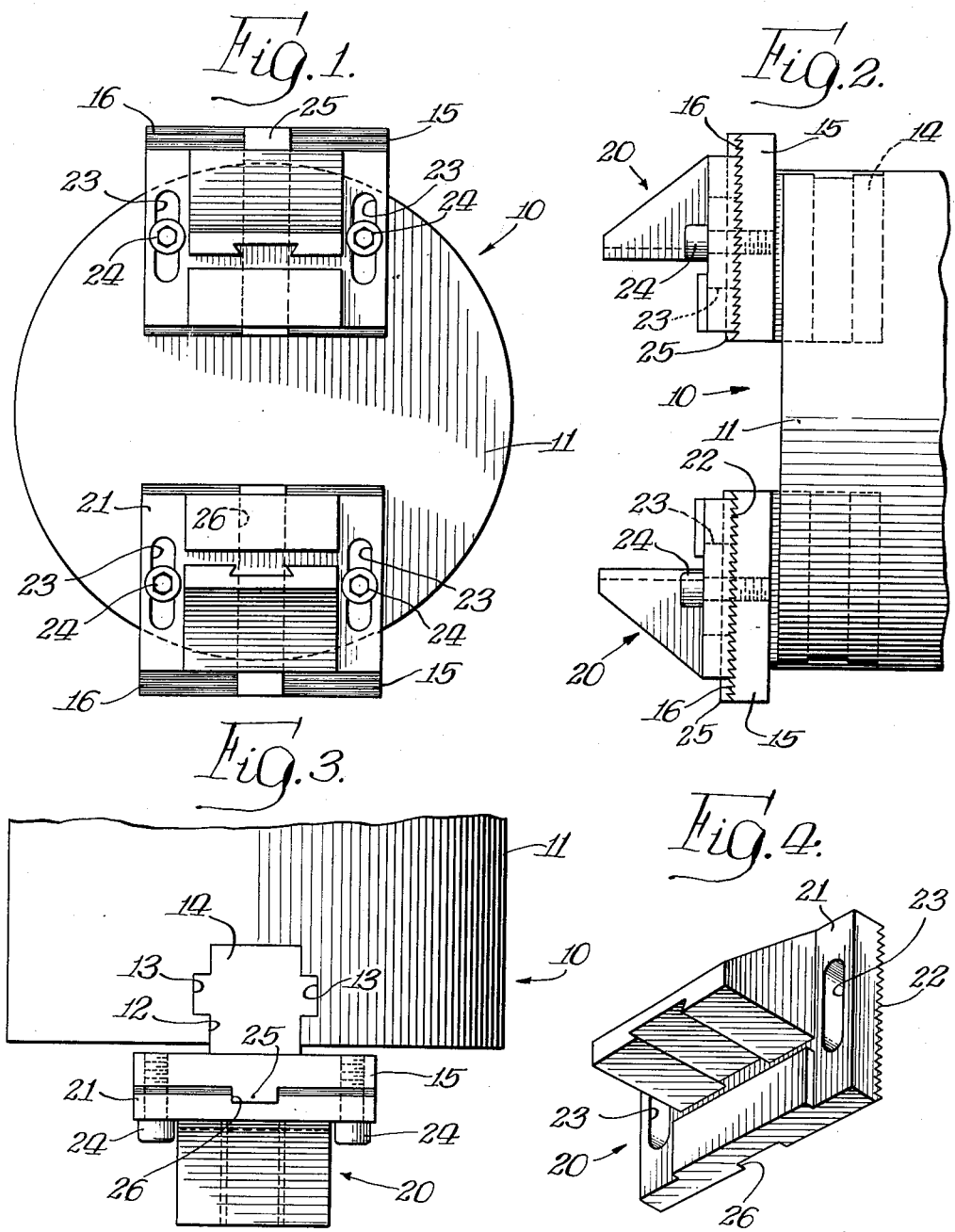
INVENTOR.
John J. Daniels,

United States Patent Office 2,726,092
Patented Dec. 6, 1955

2,726,092

CHUCK

John J. Daniels, Chicago, Ill., assignor to The Imperial Brass Manufacturing Company, a corporation of Illinois Application July 7, 1952, Serial No. 297,537

3 Claims. (Cl. 279—110)

This application relates to a chuck construction and more particularly to a chuck having power operated jaws which are constructed and arranged to have a relatively wide range of movement.

It is the general object of this invention to produce a new and improved chuck construction.

It is a more specific object of the invention to produce a chuck having power operated jaws together with means for adjusting the jaws so that the chuck openings, that is the spaces between the jaws, can be adjusted so as to grip objects having a rather wide range of dimensions.

Yet another object of the invention is to produce a chuck having a power operated jaw carrier together with a jaw carried thereon and to provide means for adjusting the jaw radially of the chuck and relative to the carrier to increase the range of movement of the jaws.

A further object of the invention is to produce a chuck construction of the type described in the preceding paragraph wherein the jaw is firmly and solidly mounted on the carrier in all positions to which it may be adjusted relative thereto.

Another object of the invention is to produce a chuck having a jaw carrier movable through a limited range by power means, with the carrier having a radially extending serrated face together with a jaw having a serrated face complementary to the serrations in the carrier face and securable to the carrier with the serrations interengaging in any one of a plurality of positions whereby the jaw may be adjusted radially relative to the carrier and thereby to increase the over-all radial movement of the chuck jaws.

Other and further objects and advantages of the invention will be readily apparent from the following description and drawing, in which:

Fig. 1 is a front elevational view of a chuck embodying the jaw construction of this invention;

Fig. 2 is a side elevational view of the chuck shown in Fig. 1;

Fig. 3 is a top plan view of the chuck of Fig. 1; and

Fig. 4 is a perspective view of the jaw portion of the chuck.

While this invention is susceptible of embodiments in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, the chuck 10 includes a circular base member 11 adapted to be secured to a lathe or other machine tool for rotation thereby. The base member is provided with a plurality of radial slots 12 each having oppositely facing notched portions 13 and slidably receiving a jaw carrier 14 formed complementary to the recess 12 and movable radially of the axis of rotation of the chuck by power operated means such as fluid under pressure. Such power means for operating the jaw carrier are well known in the art and need not be further described herein. In the conventional construction, however, the jaw of the chuck forms an integral part of the jaw carrier and hence the radial movement of the jaw is limited by and is the same as the radial movement permitted the jaw carrier. Thus in conventional constructions an 8 inch chuck has a range of about ¾ inch, that is each carrier is movable radially inwardly and outwardly through a range of about ⅜ inch. One of the principal features of the present invention is the provision of a jaw member which is securable to the carrier in any one of a plurality of radially adjusted positions so as to increase the normal range of a power operated chuck.

To this end the carrier 14 is provided with a face forming member 15 having engaging means in the form of serrations 16 on its outer face. The outer face extends radially of the axis of the chuck for whatever distance may be necessary to provide the additional range of adjustment required. In the particular chuck chosen for the purpose of illustration two such carriers 14 are provided, each of which is adapted to support a jaw 20. Each jaw is provided with a base portion 21 having a flat inner face formed into engaging means complementary to those on the face of the carrier and herein taking the form of serrations 22 having teeth adapted to lock with the teeth formed in the serrations on the carrier. Each jaw is provided with a pair of slots 23 through which bolts 24 extend, with the bolts being threadably received in the face forming portion 15 of the carrier.

It will be noted that the base 21 is shorter in radial dimension than the face forming member 15 and thus in most positions of adjustment of the jaw relative to the carrier the entire face of the base member 21 rests against and is supported by the portion 15. In extreme positions of adjustment a small amount of the base member 21 may overhang the face forming member 15 but that part of the base member remaining in contact with the portion 15 is sufficient to hold the jaw firmly against the carrier so that no loss in clamping pressure results due to twisting of the jaws.

In order more firmly to hold the jaw on the carrier the latter is provided with an integral tongue portion 25 slidably engaged by a suitable recessed portion 26 formed on the inner side of the base member 21.

Preferably the teeth of the serrations 16 and 22 are spaced apart a distance of approximately ⅛ inch although if a finer degree of adjustment of the jaw relative to the carrier is desired the teeth may be made closer together.

It is believed readily apparent from the foregoing description that the limited range of movement of the carrier is augmented by the range of movement permitted it relative thereto. Thus, for example, if the range of movement of each carrier is approximately ⅜ inch the chuck is capable of gripping articles differing in diameter through a range of ¾ inch. If, however, the construction of this invention is used and each slot 23 has a length of 1½ inches, for example, each jaw is movable radially through a total distance of 1⅞ inches giving a range of 3¾ inches, thus increasing the total range of the chuck fivefold.

I claim:

1. In a chuck, a jaw carrier mounted on the chuck for radial movement through a limited range, said carrier having a radial extended substantially flat surface portion, a plurality of serrations formed in said surface portion, a separate jaw member having a substantially flat surface portion formed with a plurality of serrations complementary to those on the carrier surface portion and engageable therewith in any one of a plurality of positions, a radially extending tongue formed on one of said surface portions, a groove formed on the other surface portion and mating with the tongue, and means for securing the jaw to the carrier in any one of said positions.

2. In a chuck, a jaw carrier mounted on the chuck for radial movement through a limited range, said carrier having a substantially flat radially extended surface portion, a plurality of serrations formed in said surface portion, a separate jaw member having a substantially flat surface portion formed with a plurality of serrations complementary to those on the carrier surface portion and engageable therewith in any one of a plurality of positions, a radially extending tongue formed on one of said surface portions, a groove formed on the other surface portion and mating with the tongue, a pair of slots formed in the jaw, and a pair of screw devices threadably received in the carrier and extending through the slots for securing the jaw to the carrier in any one of said positions.

3. In a chuck, a jaw carrier mounted on the chuck for radial movement through a limited range, said carrier having a radially extended substantially flat serrated surface portion, a separate jaw member having a jaw portion and a substantially flat serrated surface portion of lesser radial extent than said surface portion of the carrier but sufficient to form a firm support for the jaw member, a pair of elongated slots formed in said surface portion of the jaw member and spaced apart transversely to the radially extending centerline of said jaw member with the direction of elongation parallel to said centerline, and a pair of screw devices threadably received in the carrier and extending through the slots for securing the jaw member to the carrier in any one of a plurality of radially spaced positions.

References Cited in the file of this patent

UNITED STATES PATENTS

| | | |
|---|---|---|
| 1,399,194 | Cole | Dec. 6, 1921 |
| 2,261,836 | Sloan et al. | Nov. 4, 1941 |
| 2,472,040 | Brookfield | May 31, 1949 |